United States Patent [19]

McCrickerd

[11] 4,268,799
[45] May 19, 1981

[54] CURVED MIRROR LASERS AND METHODS OF OPERATING SAME

[75] Inventor: John T. McCrickerd, Costa Mesa, Calif.

[73] Assignee: Laser Products Corporation, Fountain Valley, Calif.

[21] Appl. No.: 1,504

[22] Filed: Jan. 8, 1979

[51] Int. Cl.³ .............................................. H01S 3/05
[52] U.S. Cl. .............................................. 331/94.5 C
[58] Field of Search ..................... 331/94.5 C, 94.5 D, 331/94.5 G

[56] References Cited

U.S. PATENT DOCUMENTS 3,055,257  9/1962  Boyd et al. ..................... 331/94.5 C
3,898,586  8/1975  Nelson et al. .................. 331/94.5 G

OTHER PUBLICATIONS

*Laser Devices and Applications*, edited by Ivan P. Kaminow and A. E. Siegman, (IEEE Press), 1977; pp. 2 et seq. "Coherent Optical Sources for Communication", S. E. Geusic et al.
*The Story of the Laser*, by J. M. Carroll, pp. 17 et seq.
*Lasers: A Series of Advances*, edited by A. V. Levine, vol. 1, Chapt. 5, "Modes in Optical Resonators", by H. Kogelnik, p. 312.
"Laser Beams and Resonators", by H. Kogelnik and T. Li, *Applied Optics*, vol. 5, No. 10, (Oct. 1966), pp. 1550 et seq.
"Semiconductor Lasers", by Marshall I. Nathan, in Laser Devices and Applications by Ivan Kaminow et al., pp. 60 et seq.
*Introduction to Optical Electronics*, Amnon Yariv, (2nd edition 1976), pp. 72 et seq.
*Introduction to Laser Physics*, Bela A. Lengyel.
"Choice of Mirror Curvatures For Gas Laser Cavities", *Applied Optics*, vol. 3, No. 9, (Sep. 1964), pp. 1067-1071, by Douglas C. Sinclair.
*Masers and Lasers* by M. Brotherton, (McGraw-Hill, 1964), pp. 129-137.

Primary Examiner—William L. Sikes
Assistant Examiner—Léon Scott, Jr.
Attorney, Agent, or Firm—Benoit Law Corporation

[57] ABSTRACT

Laser apparatus having a pair of concave end mirrors facing each other through a laser gain medium. The end mirrors are mounted so as to permit tilting thereof. One of the end mirrors has a center of curvature situated between the end mirrors at a distance from the other end mirror of up to one-eighth of the distance between the end mirrors through the laser gain medium. The other end mirror has a center of curvature situated between the end mirrors at a distance from each of the end mirrors of at least three-eighth of the distance between the end mirrors through the laser gain medium. In practice, this substantially reduces the sensitivity of the laser apparatus and laser action to end mirror tilting and to bending of the laser gain medium or of a tube containing same. It also substantially increases the alignment tolerance and adjustability of the end mirrors and other parts of the laser structure and permits potting of gas lasers.

42 Claims, 6 Drawing Figures

CURVED MIRROR LASERS AND METHODS OF OPERATING SAME

BACKGROUND OF THE INVENTION

1. Field of the Invention

The subject invention relates to lasers, to their design and construction, and to their operation, and, more specifically, relates to lasers having concave end mirrors, to methods of operating same, reducing optical mode and bore interference therein, reducing their mirror tilting and bending sensitivity, and to their design, construction and structure.

2. Prior-Art Statement

The feasibility of producing laser action in a mixture of helium and neon gas was recognized some two decades ago and brought forth the first laser capable of operating continuously with very low energy inputs. In a gas laser complex physical phenomena have to interact in the gas charge in a certain manner calculated to bring forth a non-equilibrium condition characterized by the existence of a pair of energy levels of which the higher is more densely populated than the lower. In the past, literature on gas lasers has recognized the difficulty of discovering what transitions among the energy levels of a gas may be used for laser oscillations and what the optimum conditions for the excitation of these oscillations are, but has tended to represent the reproduction of a gas laser as a relatively modest task, requiring only moderate skill in optics and in vacuum technology (see Bela A. Lengyel, INTRODUCTION TO LASER PHYSICS [John Wiley and Sons, Inc., 1966] pp. 168 et seq.)

The latter assumption may have some validity in connection with low-efficiency experimental models, but so far has tended to inhibit radical progress in increasing the efficiency, broadening the utility and improving the quality of operation of commercial gas lasers. In particular, existing gas lasers are sensitive to tilting of the end mirrors and bending of the cavity. In helium-neon lasers, for example, this sensitivity increases as the diameter of the cavity is decreased in the interest of facilitating production of population inversion in the contained gas fill requisite to laser action.

A similar limitation exists with respect to the danger of substantial laser mode and bore interference. In this respect, it has to be kept in mind that effective laser action depends on a buildup of energy by repeated reflection of radiation between two end mirrors through a gas fill or other laser gain medium. In practice, there are definite ways or modes in which radiation in the gas fill or other laser gain medium can go back and forth between the end mirrors prior to escaping as a high-energy coherent beam through a predetermined one of these mirrors. In the fundamental mode, the energy distribution for the particular radiation is of a Gaussian nature, having a high intensity at the center of the mode and, graphically speaking, tapering off laterally in a bell-shaped curve. In consequence, the mode has no sharply defined width by nature. In practice, it is nevertheless customary to speak about a "width of the mode" by simply disregarding low-energy fringe areas of the Gaussian distribution.

Thus, the width of the mode is frequently defined as the diameter of the cross-section within which 86% of the energy occurs. Similar considerations apply to solid-state lasers where the mode has to pass through the confines of the solid lasing medium.

In practice, imperfect alignment or tilting of the end mirrors frequently impairs the development or maintenance of the mode. Even if a laser is in perfect condition at a certain point of time, thermal effects, occurring stresses and other operating conditions may engender an impairment of the mode during operation of the laser.

Douglas C. Sinclair, in "Choice of Mirror Curvatures for Gas Laser Cavities," APPLIED OPTICS, Vol. 3, No. 9 (September 1964), pp. 1067-71, examined alignment tolerance problems in three classes of laser cavities: the double concave cavity with end mirrors of equal concave curvature, the plano-concave or hemispherical cavity, and the concave-convex cavity. As a result of his examinations, Sinclair's article designated the near-hemispherical cavity as the easiest of all curved mirror cavities to align.

By way of background, a half-concentric or near-hemispherical cavity has a flat end mirror paired with a concave end mirror having a radius slightly greater than the length of the cavity and is also referred to as a half-concentric resonator. If the flat and concave mirrors in such a resonator are simultaneously tilted, such as through bending of the laser or of a supporting structure, the mode of the laser, that is, the way by which radiation from stimulated emission will travel back and forth between the end mirrors, shifts transversely due to the tilting of the mirrors and, moreover, is swept angularly due to the tilt of the flat mirror. The mode also shifts transversely even if only the concave mirror is tilted.

In the nearly concentric cavity, two concave mirrors have their centers of curvature lying near the center of the cavity. If the end mirrors in such nearly-concentric configuration are tilted due to bending of the gas discharge tube, then the mode of the laser shifts transversely. In consequence, the mode of the laser will be obstructed by the walls of the laser bore or confines of the lasing medium, resulting in degradation of the quality of the mode and of the light-output characteristics of the laser. The nearly-concentric configuration is especially sensitive to individual tilting of the end mirrors.

The known nearly-confocal configuration has two concave mirrors with their focal points lying near the center of the cavity or the midpoint between the two end mirrors. Since the focal length of a concave mirror is one-half its radius of curvature, the center of curvature of each mirror in the nearly-confocal configuration lies near the opposite mirror. In the book LASERS, edited by Albert K. Levine, Vol. 1 (Marcel Dekker, Inc., New York 1966), Ch. 5, "Modes in Optical Resonators," by H. Kogelnik, p. 312, the confocal geometry is designated as the easiest to align. However, with this configuration, simultaneous tilting of the end mirrors, such as due to bending of the laser or of a supporting structure, results in a strong transverse shift of the laser mode along the entire length of the cavity.

In consequence of these drawbacks, bending of the specifically mentioned and other prior-art laser structures frequently caused such interference of the mode with the edge of the laser bore or confinement of the lasing medium that the mode was severely degraded or even extinguished.

Accordingly, the prior art has developed proposals for preventing the mirrors from tilting. For instance, the laser structure and especially the parts holding the mirrors have been made as stiff as possible. In some instances, special mechanisms have been devised to isolate the mirror mounts from forces that would tilt the mirrors. Such prior art measures tend to encumber the laser structure and to add considerably to its weight and cost.

In an attempt to increase mode/bore tolerances, prior-art gas lasers exposed to bending effects or similar mirror/bore alignment problems typically have been provided with a bore that was considerably larger relative to the effective mode width than would have been ideal from the point of view of sustained population inversion generation and output/input efficiency. In addition to entailing a sacrifice in efficiency, a liberal bore width permits development of divergent modes or non-circularly-symmetrical mode/bore relationships.

In order to enable a better control over the mode, some designs have provided a bore with a carefully selected ideal diameter at one point along its length, but larger-than-ideal diameter or diameters over the remainder of the bore. Such approach, however, requires that the mode be aligned so that its cross-section is concentric with the ideal diameter exactly at the point of location of such limiting aperture. This requirement of itself introduces design limitations and still cannot remove the main disadvantage that the excessively large diameter besides the limiting aperture inevitably decreases the effectiveness of the active medium on which the optical mode feeds and thereby diminishes the strength of the mode and the light output of the laser.

In the general context of this prior-art statement, reference may be had to the article entitled "Laser Beams and Resonators" by H. Kogelnik and T. Li, in APPLIED OPTICS, Vol. 5, No. 10 (October 1966) pp. 1550 et seq. In Section 2.3 of that article, the authors deal with the stability of laser resonators and set forth the stability condition in the form of $$0 < \left(1 - \frac{d}{R_1}\right)\left(1 - \frac{d}{R_2}\right) < 1 \tag{1}$$

wherein
d = distance between end mirrors or length of resonator cavity,
$R_1$ = radius of curvature of one end mirror,
$R_2$ = radius of curvature of the other end mirror.

In FIG. 4 of that article, the authors also supply a stability diagram in the plane $1/R_1$ vs. $1/R_2$ having a pair of white areas representing stable regions and two pairs of shaded areas indicating unstable regions. In particular, the boundary lines between the stable an unstable regions are two straight lines given by $$d/R_1 = 1, \quad d/R_2 = 1 \tag{2}$$

and a pair of hyperbolae which satisfy $$d = R_1 + R_2 \tag{3}$$

excluding the origin $d/R_1 = d/R_2 = 0$.

The mentioned FIG. 4 of the article under consideration also contains sketches of end mirror pairs with associated radii. No consideration, however, appears to be given to the subjects of reducing bending sensitivity or increasing alignment tolerance in gas lasers. Rather, different proportions of mirror radius pairs are effectively treated as equivalent in the stable regions of the mentioned diagram.

Reference may in this respect also be had to the above mentioned book entitled LASERS which on page 309 in FIG. 4 also shows the above mentioned stability diagram and elaborates on stability conditions in Section III. A. on pp. 308 et seq., giving the equation $$0 < [(d/R_1) - 1][(d/R_2) - 1] < 1 \tag{4}$$

as an equivalent to the above mentioned stability equation (1).

Similarly, reference may be had to INTRODUCTION TO OPTICAL ELECTRONICS by Amnon Yariv (Holt, Rinehart and Winston, 2nd. ed. 1976) which on pp. 72 et seq. also shows the above mentioned stability diagram and sets forth useful information on resonator modes.

None of these references, however, offer or suggest a solution to any of the above mentioned problems.

Prevailing prior-art drawbacks and limitations have prevented widespread use of a technique which is working quite successfully in other areas; namely the technique of potting. For instance, potting of the tube or other fragile structure of a gas or similar laser could render the laser practically non-breakable or shatterproof. Potting could also eliminate undesired air convection at the laser tube and prevent a buildup of transverse temperature gradients which, in turn, would promote bending of the laser tube.

Potting moreover could protect lasers from the elements or from detrimental aspects of their environments.

So far, tubular lasers could, however, not be potted, since this in practice would lead to laser cavity bending and mirror tilting effects that impaired or inhibited laser operation.

SUMMARY OF THE INVENTION

It is generally an object of the invention to overcome the above mentioned disadvantages.

It is a related object of this invention to provide improved laser apparatus and devices, methods of providing laser action, and methods for operating laser apparatus.

It is a related object of this invention to reduce sensitivity of laser apparatus and laser action to tilting of end mirrors, bending of the laser gain medium or tube, and to similar influences.

It is also an object of this invention to avoid substantial degradation or interruption of the or a laser mode by interference with a laser bore or similar confinement of the lasing medium.

It is a related object of this invention to improve the compatibility and alignment capability among end mirrors and laser bores or similar confinement of the lasing medium.

It is also an object of this invention to improve the output/input efficiency of laser apparatus and methods.

It is a related object of this invention to optimize the relationship between mode width and width of the laser bore or other confinement of the lasing medium.

It is also an object of this invention to minimize lateral deviations of the or a mode within a laser bore or other confinement of the lasing medium.

It is a related object of this invention to provide adjustment tolerant laser apparatus and structures.

It is also an object of this invention to provide methods for potting, lasers, and potted lasers, having an elongate laser cavity.

Other objects will become apparent in the further course of this disclosure.

From a first aspect thereof, the subject invention resides in laser apparatus comprising, in combination, means for providing laser action, including a laser gain medium and a pair of concave end mirrors facing each other via the laser gain medium, and means for mounting the end mirrors and permitting tilting thereof, one of the end mirrors having a center of cuvature situated between the end mirrors at a distance from the other end mirror of up to one-eighth of the distance between the end mirrors through the laser gain medium, and the other end mirror having a center of curvature situated between the end mirrors at a distance from each of the end mirrors of at least three-eighth of the distance between the end mirrors through the laser gain medium.

From another aspect thereof, the subject invention resides in laser apparatus comprising, in combination, means for providing laser action, including a gaseous laser gain medium, a bendable laser tube having a longitudinal bore for containing the gaseous laser gain medium, and a pair of concave end mirrors facing each other via the gaseous laser gain medium and bore, and means for mounting the end mirrors and the bendable tube and permitting bending of the tube, one of the end mirrors having a center of curvature situated between the end mirrors at a distance from the other end mirror of up to one-eighth of the distance between the end mirrors through the longitudinal bore, and the other end mirror having a center of curvature situated between the end mirrors at a distance from each of the end mirrors of at least three eighth of the distance between the end mirrors through the longitudinal bore.

From another aspect thereof, the subject invention resides in laser apparatus comprising, in combination, means for providing laser action, including a gaseous laser gain medium, a bendable laser tube containing the gaseous laser gain medium, and a pair of concave end mirrors mounted at opposite ends of the laser tube and facing each other via the gaseous laser gain medium, and means for mounting the laser tube including a container having wall portions laterally spaced from the laser tube, and material for potting the laser tube in the container, one of the end mirrors having a center of curvature situated between the end mirrors at a distance from the other end mirror of up to one-eighth of the distance between the end mirrors through the longitudinal bore, and the other end mirror having a center of curvature situated between the end mirrors at a distance from each of the end mirrors of at least three eighth of the distance between the end mirrors through the longitudinal bore.

From another aspect thereof, the subject invention resides in laser apparatus of the above mentioned type, including a container for the above mentioned laser action providing means having wall portions laterally spaced from such laser action providing means, and material in such container for potting the laser action providing means in the container.

From another aspect thereof, the subject invention resides in a method of providing laser action and, more specifically, resides in the improvement comprising in combination the steps of providing a laser gain medium, providing a pair of concave end mirrors facing each other via the laser gain medium by providing one of the mirrors with a center of curvature situated between the end mirrors at a distance from the other end mirror of up to one-eighth of the distance between the end mirrors through the laser gain medium and providing the other end mirror with a center of curvature situated between the end mirrors at a distance from each of the end mirrors of at least three-eighth of the distance between the end mirrors through the laser gain medium, permitting the end mirrors to tilt, and providing laser action with the laser gain medium and titled concave end mirrors.

From another aspect thereof, the subject invention resides in a method of providing laser action and, more specifically, resides in the improvement comprising in combination the steps of providing a gaseous laser gain medium, containing the gaseous laser gain medium in a bendable laser tube having a longitudinal bore, providing a pair of concave end mirrors facing each other via the gaseous laser gain medium and bore by providing one of the mirrors with a center of curvature situated between the end mirrors at a distance from the other end mirror of up to one-eighth of the distance between the end mirrors through the longitudinal bore and providing the other end mirror with a center of curvature situated between the end mirrors at a distance from each of the end mirrors of at least three-eighth of the distance between the end mirrors through the longitudinal bore, bending the laser tube, and providing laser action with the gaseous laser gain medium and end mirrors at least while the laser tube is bent.

From another aspect thereof, the subject invention resides in a method of providing laser action and, more specifically, resides in the improvement comprising in combination the steps of providing a gaseous laser gain medium, containing the gaseous laser gain medium in a bendable laser tube, providing a pair of concave end mirrors facing each other via the gaseous laser gain medium by providing one of the mirrors with a center of curvature situated between the end mirrors at a distance from the other end mirror of up to one-eighth of the distance between the end mirrors and providing the other end mirror with a center of curvature situated between the end mirrors at a distance from each of the end mirrors of at least three-eighth of the distance between the end mirrors, providing a container for the laser tube having wall portions laterally spaced from the laser tube, potting the laser tube in the container with a potting material, and providing laser action with the end mirrors and gaseous laser gain medium in the potted laser tube.

From another aspect thereof, the subject invention resides in a method of the above mentioned type for providing laser action and, more specifically, resides in the improvement comprising in combination the steps of providing a laser structure including the above mentioned end mirrors and containing the laser gain medium, providing a container for the laser structure having wall portions laterally spaced from the laser structure, potting the laser structure in the container with a potting material introduced into the container, and providing laser action with the end mirrors and laser gain medium in the potted laser structure.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
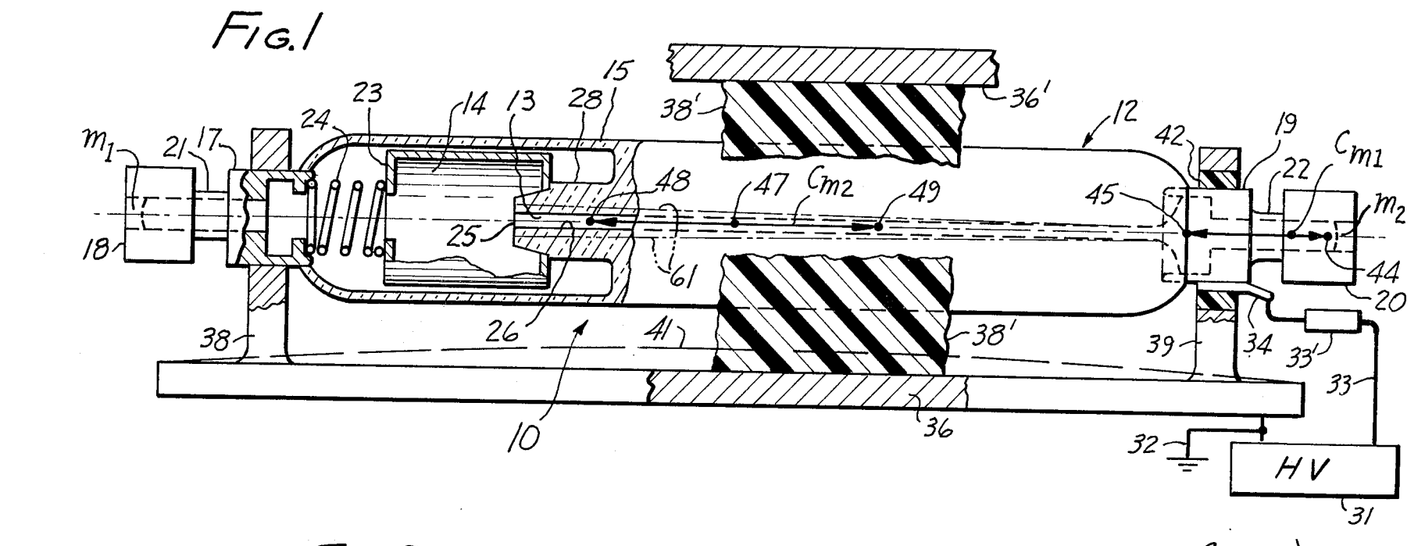
FIG. 1 is a side view, partially in section, of a laser apparatus in accordance with preferred embodiments of the subject invention.

The laser apparatus 10 shown in FIG. 1 comprises a gas laser 12 having a gaseous laser gain medium contained in an optical cavity 14 or laser tube 15 between a pair of concave end mirrors $m_1$ and $m_2$, which face each other via the laser gain medium 13. The expression "laser gain medium" is herein employed to designate the laser component which imparts optical regenerative gain to light traveling along the cavity of a laser action device. In this respect, the expression "laser action" is herein employed in preference to the familiar phrase "light amplification by stimulated emission of radiation," since the quantum device called "laser" more appropriately may have to be viewed as an oscillator, rather than a mere amplifier [see John M. Carroll, THE STORY OF THE LASER (E. P. Dutton and Co., 1964) pp. 17 et seq., and Joseph E. Geusic et al., Coherent Optical Sources for Communications, in LASER DEVICES AND APPLICATIONS, by Ivan P. Kaminov et al. (IEEE Press, 1977) pp. 2 et seq.]

The gaseous medium 13 may, for instance, be a helium and neon gas laser gain medium. Alternatively, an argon, carbon dioxide, or other gaseous laser gain medium may be employed in a gas laser according to the subject invention.

The end mirrors $m_1$ and $m_2$ are interconnected with the laser tube 15 and, in the illustrated preferred embodiment, are mounted at opposite ends of the tube 15.

In particular, the tube 15 includes a first extension or nipple 17, in an end portion 18 of which the mirror $m_1$ is mounted. Similarly, the laser tube 15 at its other end has an extension or nipple 19, in an end portion 20 of which the mirror $m_2$ is mounted. Reduced diameter neck portions 21 and 22 in the nipples 17 and 19 are bendable to permit lateral adjustment or alignment of the end mirrors relative to the laser cavity 14 during manufacture or readjustment of the laser device.

In principle, lasers employing the principles of the subject invention may be excited in any suitable manner, including optical, chemical or electrical pumping, such as with the aid of a radio-frequency field or electric gas discharge. In the preferred embodiment shown in FIG. 1, gas discharge pumping is employed. To this end, the gas laser 12 has a hollow-cylindrical cathode 23 electrically connected to the nipple 17 by a helical spring 24.

The cathode cylinder 23 is disposed at and encompasses the end or terminal aperture 25 of a bore 26 which longitudinally extends through the laser tube 15 between the nipple 19 and the bore aperture 25 located at a distance from the nipple 17. As shown in FIG. 1, part of the bore 26 extends through a neck or nipple 28 which is formed in a larger cavity or space in part of the tube 15 and which points in the direction of the mirror $m_1$. The helical spring 24 is compressed against a shoulder portion of the end nipple 17 and biases the cathode cylinder 23 against a shoulder portion of the tube nipple 25.

In practice, a getter material (not shown) may be located in the tube 15 and such tube may also have a tip-off or conduit (not shown) through which air has been exhausted from, and gas supplied to, the laser cavity 14 prior to closure of the conduit.

Electrical pumping in the preferred embodiment shown in FIG. 1 is effected with a direct-current high voltage source 31 which provides a high voltage potential between ground 32 and an output lead 33. The electric pumping potential is applied via lead 33, ballast resistor 33' and terminal 34 to an anode formed by the nipple 19. On the other hand, the cathode 23 in the illustrated embodiment of FIG. 1 is grounded via an electrically conducting support 36, mounting post 38, nipple 17 and helical spring 24. In this manner, the electric pumping potential provided by the source 31 is applied to the laser cavity 14 and gaseous laser medium 13 via nipple 19 serving as an anode and cylinder 23 serving as a cathode. The anode and cathode may, if desired, be reversed.

In either case the gaseous laser gain medium 13 is electrically pumped or excited by means of an electrical gas discharge therein. As in other types of lasers, spatial and temporal coherence arises from the regenerative character of the combined laser gain medium 13 and optical cavity 14, 26. In this process, radiation or light travels back and forth between end mirrors $m_1$ and $m_2$ in definite ways or modes, as already indicated above. In principle, light can be permitted to escape through either or both end mirrors, depending on the intended application and operation of the laser device. However, in the illustrated preferred embodiment, the mirror $m_1$ is assumed to be a partially transmissive mirror, while the mirror $m_2$ is a highly reflecting mirror, so that the luminous laser output will proceed via mirror $m_1$ in the form of a laser beam.

The laser tube 15 is made of an electrically insulating material, such as glass or a ceramic, at least in the vicinity of the longitudinal bore 26.

Of course, the entire tube 15 may be made of glass or a metal-ceramic structure, for instance. The end nipples 17 and 19 are made of electrically conductive material which typically is a metal.

While the reduced diameter neck portions 21 and 22 have been described above as bendable for adjustment purposes, it should be recognized that the laser tube 15 with extensions 17 and 19 is in fact bendable, even if made of glass or a ceramic or if composed of a metal-ceramic structure. By the same token, the end mirrors $m_1$ and $m_2$ are tiltable, typically in opposite senses, be it by virtue of their attachment to opposite ends of the tube 15 via nipples or tube extensions 17 and 19 or by virtue of their coupling to the bendable structure 36 via nipples 17 and 19 and apertured mounting posts or plates 38 and 39.

In particular, the mounting posts 38 and 39 are attached to, and rise perpendicularly from, the bendable support 36. Accordingly, if the support 36 is bent in a first direction, such as indicated by a curved dotted line 41 in FIG. 1, then the mounting posts 38 and 39 tilt away from each other, to extend divergently as seen from the base of the support 36. As a result, the laser tube 15 or in effect the entire gas laser 12 is bent in the sense indicated by the dotted line 41, and the mirrors $m_1$ and $m_2$ are tilted in opposite senses. In particular, the mirror $m_1$ is tilted in the same sense as the mounting post 38 to which it is coupled via the nipple 17. An annular electrically insulating spacer 42 which prevents a short circuit between the high voltage terminal 34 and ground 32 is interposed between the mounting post 39 and the nipple 19 with terminal 34, and the second end mirror $m_2$ is tilted in the same sense as the mounting post 39 to which it is coupled via nipple 19. Of course, the direction of bending of the laser tube 15 and the opposite senses of tilting of the end mirrors $m_1$ and $m_2$ are reversed if the support 36 is bent in a direction opposite to the direction indicated by the dotted line 41. Also within the contemplation of the subject invention, either end mirror could be tilted or adjusted independently of the other and either or both end mirrors could be tilted independently of any bending of the tube 12. Also, the principles of the subject invention are operative within reasonable limits whether the bending of the gas laser 12 or tube 15 and the tilting of the end mirrors $m_1$ and $m_2$ is permanent on the one hand or elastic on the other.

In this connection, the thought may well arise that significant bending the gas laser and tilting of the end mirrors could be avoided by an appropriate mounting thereof. For instance, one may be tempted to think that a mounting component, such as the insulating spacer 42, could be made sufficiently pliant to avoid a transmission of bending stress from the structure 36 to the tube 15 and/or end mirrors $m_1$ and $m_2$. Indeed, the subject invention does not categorically exclude any use of such auxiliary mounting techniques. However, the ultimate solution to the initially mentioned problems does not according to the subject invention reside in the use of auxiliary mounting techniques.

In practice, there are cogent reasons for this fact. For one thing, bending and tilting stresses affecting the laser tube and end mirrors frequency arise in practice from sources other than the mounting support. For instance, adjacent heat-generating equipment or, in outdoor applications, the sun may unevenly heat the laser structure, thereby causing bending of the laser tube 15 and tilting of the end mirrors $m_1$ and $m_2$ by unequal thermal expansion. Obviously, a stress isolation of the laser structure from the support 36 would not avoid this effect. Moreover, mechanical, electrical and other physical considerations frequently render potting of the laser 12 very desirable. Also, in some applications the nature and intended function of the laser equipment may directly require that the laser beam experience a deviation indicative of the bending or similar deviation of a support, so that a stress isolation of the laser structure from the support would destroy the utility of the equipment.

In the light of these and similar considerations, the illustrated preferred embodiment thus couples the bendable laser structure 12, including bendable laser tube 15 and tiltable end mirrors $m_1$ and $m_2$ to the support 36 for bending of the laser structure 12 and tube 15 with the bendable support 36. By the same token, the bendable support is coupled to the end mirrors $m_1$ and $m_2$ for tilting of these end mirrors, typically in opposite senses, upon bending of the support 36.

For instance, the laser may be coupled to the bendable support through a potting compound 38'. Alternatively, the laser structure 12 may be coupled to the bendable support 36 at two spaced locations.

In particular, the mounting post 38 couples a first portion of the support 36 to the one end mirror $m_1$, while the mounting post 39 couples a second portion of the support 36, spaced from the mentioned first portion, to the other end mirror $m_2$. In this manner, the end mirrors are tilted in opposite senses with the bending support 36.

The end mirrors $m_1$ and $m_2$ are concavely ground from glass or another suitable transparent material and are polished and provided with reflecting surfaces in a conventional manner. Depending on the nature of the laser, copper or other metallic layers or dielectric multilayer systems may be employed to render the end mirrors reflective to the desired extent. For instance, and as indicated above, the end mirror $m_1$ may be rendered partially transmitting so as to serve as the output mirror for the laser 12. Conversely, the mirror $m_2$ may be made as highly reflective as possible for the light that is to be emitted in the laser beam via end mirror $m_1$.

According to the subject invention, the one end mirror $m_1$ has a center of curvature $c_{m1}$ situated between the end mirrors $m_1$ and $m_2$ at a distance from the other end mirror $m_2$ of up to one-eighth of the distance between the end mirrors through the laser gain medium 13. To satisfy the stability requirements mentioned above in connection with equations (1) to (4), the distance between the mirror $m_2$ and the center of curvature $c_{m1}$ must not be zero, but has to be an actual distance. In other words, the radius of curvature of mirror $m_1$ has to be less than the length of the cavity or distance between the mirrors $m_1$ and $m_2$.

In particular, when the center of curvature $c_{m1}$ of the mirror $m_1$ is close to the mirror $m_2$ as shown at 44, then the mode of the laser at the mirror $m_2$ is narrower than if that center of curvature of the mirror $m_1$ is spaced by the maximum one-eighth of the distance between the end mirrors, as indicated at 45. The radius of curvature of the mirror $m_1$ may thus vary between a minimum of seven-eighth of the cavity length or distance between mirrors $m_1$ and $m_2$, to a maximum slightly shorter than the cavity length or distance between the end mirrors, for stability reasons. The relatively narrow end of the mode at the mirror $m_2$ becomes wider as the center or curvature $c_{m1}$ of mirror $m_1$ is moved away from the mirror $m_2$ within the range of distance of the subject invention.

Further according to the subject invention, the other end mirror $m_2$ has a center of curvature $c_{m2}$ situated between the end mirrors $m_1$ and $m_2$ at a distance from each of the end mirrors $m_1$ and $m_2$ of at least three eighth of the distance between the end mirrors $m_1$ and $m_2$ or length of the laser cavity through the laser gain medium 13. In other words, the center of curvature $c_{m2}$ of the mirror $m_2$ may be located within a range extending on either side of the mid-point 47 of the length of the laser cavity or distance between the end mirrors $m_1$ and $m_2$. For instance, if 47 in FIG. 1 indicates such midpoint, then the center of curvature $c_{m2}$ of the mirror $m_2$ may extend for one-eighth of the length of the cavity or distance between end mirrors in the direction of the first end mirror $m_1$ as indicated at 48, and for a distance of one-eighth of the length of the cavity or distance between end mirrors in the direction of the second end mirror $m_2$ as indicated at 49 in FIG. 1; always measured from the midpoint 47.

The radius of curvature of the second mirror $m_2$ thus may have a value within a range of one-quarter, from a minimum of three-eighth to a maximum of five-eighth, of the length of the cavity or distance between end mirrors $m_1$ and $m_2$. In this manner, the centers of curvature $c_{m1}$ and $c_{m2}$ of the end mirrors $m_1$ and $m_2$ are spaced from each other by at least one-quarter of the cavity length or distance between end mirrors $m_1$ and $m_2$.

With the centers of curvature $c_{m1}$ and $c_{m2}$ of both mirrors located within the laser cavity or bore as specified, thereby being spaced apart by at least one-quarter of the cavity length or end mirror distance, adjustment and alignment of the end mirrors $m_1$ and $m_2$ during manufacture or realignment of the laser device may be effected easily and at great accuracy. In particular, when either of the mirrors $m_1$ and $m_2$ is adjusted, the laser mode pivots about the center of curvature of the other mirror, thereby being momentarily tied down, so to speak, at that point in the bore 13. The subject invention thus retains most of the alignment advantage of the above mentioned nearly-confocal configuration, while avoiding the bending and mirror tilting sensitivity of that cavity type which, as mentioned above, manifests itself in a strong transverse shift of the laser mode along the entire length of the cavity.

Figure 2:
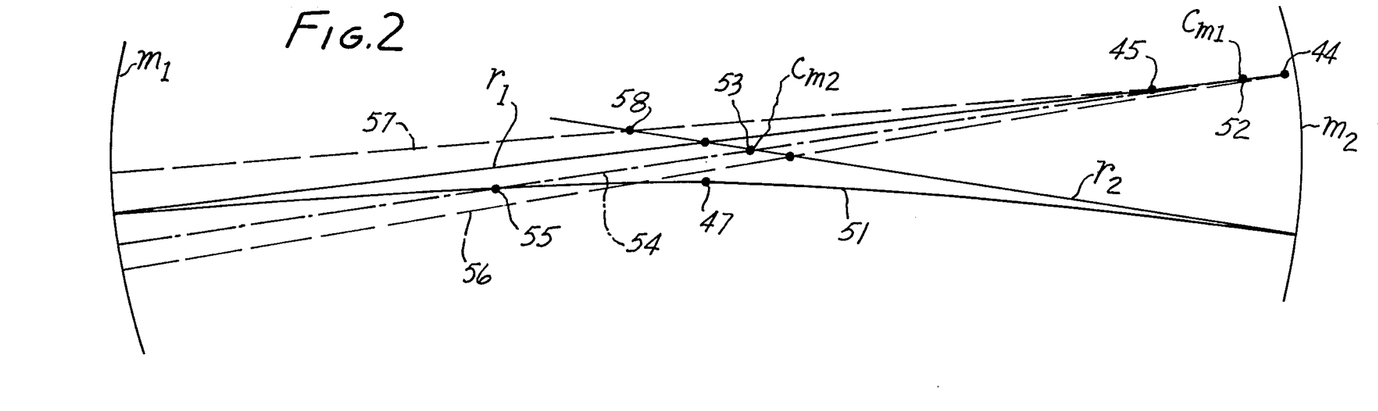
FIG. 2 is a diagrammatic view, on a laterally exaggerated scale, of modes of operation of the laser apparatus of FIG. 1.

In this respect, it has been assumed for the purpose of the showing of FIG. 2 that the laser 12 is being bent so that its normally straight longitudinal axis extends along an arc 51, with the end mirrors $m_1$ and $m_2$ thereby being tilted in opposite senses. In practice, thermal expansion effects, shock vibrations, various mechanical forces and other effects may bend the laser tube and/or tilt the end mirrors either directly or by acting on the support 36.

The radius $r_1$ of the mirror $m_1$ and the radius $r_2$ of the mirror $m_2$ typically tilt at corresponding angles as shown in FIG. 2. In practice, the laser mode extends through the centers of curvature of the mirrors $m_1$ and $m_2$. For example, if the center of curvature $c_{m1}$ is located at 52 and the center of curvature $c_{m2}$ at 53 as shown in FIG. 2, then a line 54 indicates the mode. As the end mirrors having these centers of curvature are tilted relative to each other, the mode 54 pivots through a point 55 which, in comparison to FIG. 1, is located at the end or terminal aperture 25 of the laser bore 26. In practice, this presents a very desirable solution in terms of extensive freedom from bore interference.

As indicated in FIG. 2 by the broken line 56, the pivot point or point of intersection of the mode with the longitudinal axis of the bore 13 may be shifted by changing the radii of curvature of the end mirrors within the above mentioned ranges according to the above mentioned invention. As further indicated by a broken line 57, the radius of curvature of the mirror $m_2$ may be shifted to a point 58 beyond the mid-point 47 of the cavity length or end mirror distance.

Generally, the cavity and mode configuration according to the subject invention is relatively insensitive to changes of the radius of curvature of the second mirror $m_2$ within the above mentioned range. The reason for this tolerance resides in the relative narrowness of the mode where it strikes the second mirror $m_2$, so that the actual curvature of that second mirror has relatively little effect on the mode shape. It may also be recalled in this respect that the width of the mode at the end mirror $m_2$ may be varied by variation of the radius of the mirror $m_1$.

Thus, even though both end mirrors are concave, the action of the mirror $m_2$ resembles that of a flat mirror over the small area where the mode strikes it. This provides the cavity and mirror configuration according to the subject invention with a mode similar to the mode of a hemispherical or half-concentric cavity, which Kogelnick, in his above mentioned article, has designated as easier to align than the concentric resonator, for instance. However, the mode in the configuration according to the subject invention does not tilt and sweep as strongly as the mode in a hemispherical or half-concentric resonator in response to bending of the laser tube and tilting of the end mirrors.

In this respect it should be understood that the scale of FIG. 2 in a direction transverse to the laser axis is greatly exaggerated for a better showing of the mode lines. If FIG. 2 were reduced to a realistic scale, it would be seen that there is a minimum of mode-bore interference and sensitivity to laser tube bending and end mirror tilting with the configuration of the subject invention.

In accordance with a preferred embodiment of the subject invention, the laser mode may be pivoted in accordance with the following relationship:

$$x_2 = \frac{(x_1 - x_p)d^2 + x_1 x_p^2}{2(x_1 - x_p)d + x_p^2} \tag{5}$$

wherein:
 $x_1$ = radius of curvature $r_1$ of the one mirror $m_1$,
 $x_2$ = distance between the one mirror $m_1$ and the center of curvature $c_{m2}$ of the other mirror $m_2$,
 $x_p$ = distance between the one mirror $m_1$ and a point, such as at 55, where pivoting of the laser mode takes place, and
 d = distance between the end mirrors $m_1$ and $m_2$.

Equation (5) is particularly accurate if the laser 12 is bent over its entire length in a circular or parabolic arc. With the aid of equation (5) the value $x_2$ and hence the radius of curvature of mirror $m_2$ may be selected to effect a desired value of $x_p$.

In practice, the mounting means which permit bending of the laser tube 15 or tilting of the end mirrors $m_1$ and $m_2$ may be viewed as means for pivoting the laser mode.

If the bendable support 36 is coupled to the bendable laser tube or tiltable end mirrors at a first mounting point, such as at the location of mounting post 38, located closer to the one mirror $m_1$ than to the other mirror $m_2$, and at a second mounting point, such as at the location of mounting post 39 which is spaced from the first mounting post or point, then the laser tube will only bend in a circular or parabolic arc between the two mounting points. In that case, the laser mode pivots in response to the bending of the laser tube and tilting of the end mirrors in such a way that the following relationship is satisfied:

$$x_2 = \frac{(x_1 - x_p)d^2 + x_1 x_p^2}{2(x_1 - x_p)d + x_p^2} \tag{6}$$

wherein:

$x_1$ = distance between the first mounting point at 38 and the center of curvature $c_{m1}$ of the one mirror $m_1$, $x_2$ = distance between the first mounting point at 38 and the center of curvature $c_{m2}$ of the other mirror $m_2$, $x_p$ = distance between the first mounting point at 38 and a point, such as at 55, where pivoting of the laser mode takes place, and d = distance between the mounting points at 38 and 39.

In practice, the mode may be tilted at a point in the laser cavity or bore other than the terminal aperture 25. Depending on the figuration of the mode, such other location of pivoting may provide minimum mode-bore interference.

On the other hand, the end 25 of the bore 26 may be located at a predetermined point between the end mirrors according to the following relationship:

$$x_2 = \frac{(x_1 - x_p)d^2 + x_1 x_p^2}{2(x_1 - x_p)d + x_p^2} \quad (7)$$

wherein:

$x_1$ = radius of curvature $r_1$ of the one mirror $m_1$, $x_2$ = distance between the one mirror $m_1$ and the center of curvature $c_{m2}$ of the other mirror $m_2$, $x_p$ = distance between the one mirror $m_1$ and the end 25 of the bore 26, and d = distance between the end mirrors $m_1$ and $m_2$.

If the bendable support 36 is coupled to the bendable laser tube 15 or tiltable end mirrors at two spaced mounting points, such as at the mounting posts 38 and 39, for bending the laser tube with that support, then the location of the end 25 of the bore 26 may be determined in accordance with the following relationship:

$$x_2 = \frac{(x_1 - x_p)d^2 + x_1 x_p^2}{2(x_1 - x_p)d + x_p^2} \quad (8)$$

wherein:

$x_1$ = distance between the first mounting point at 38 and the center of curvature $c_{m1}$ of the one mirror $m_1$, $x_2$ = distance between the first mounting point at 38 and the center of curvature $c_{m2}$ of the other mirror $m_2$, $x_p$ = distance between the first mounting point at 38 and the end 25 of the bore 26, and d = distance between the mounting points at 38 and 39.

Figure 3:
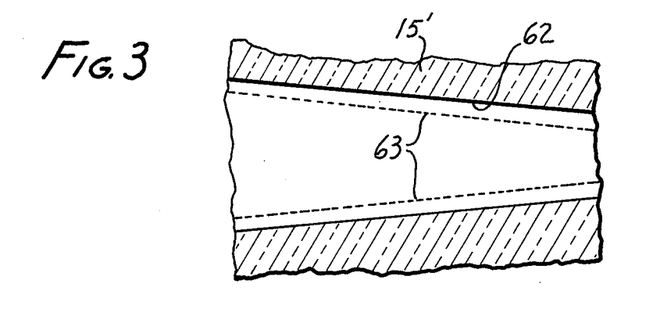
FIG. 3 is a detail view, in section, of a modified laser apparatus in accordance with a further preferred embodiment of the subject invention.

In practice, the mode typically is tapered inside the bore 26 and interference between the laser mode and bore may be minimized with a bore having a taper proceeding in a direction toward the rear or other mirror $m_2$, as indicated by a pair of converging broken lines 61 in FIG. 1. In this respect, FIG. 3 shows a tapered bore 62 proceeding from a maximum aperture 25 at the end of the bore toward the mirror $m_2$. The showing of FIG. 3 is on a greatly enlarged scale and covers only a fraction of the tapered bore in a laser cavity portion 15 spaced from nipple 28.

No novelty is herein claimed for tapered bores as such which have previously been described in a brochure of the Scientifica Laser Micrometer, Model LM-10, citing U.S. patent application Ser. No. 746,367 and British patent application No. 26,309/76. According to that prior disclosure, the tapered bore of the laser tube conforms to the taper of the particular laser mode for specific stated reasons.

Figure 4:
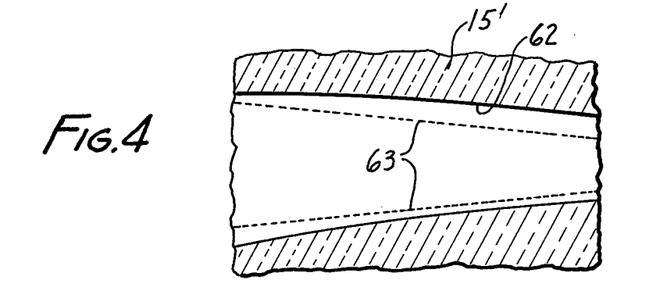
FIG. 4 is a view similar to FIG. 3, illustrating on an exaggerated scale, a mode of operation of the apparatus pursuant to FIG. 3.

On the other hand, the taper of the bore 62 according to the illustrated preferred embodiment of the subject invention shown in FIGS. 3 and 4 progresses less rapidly than the taper of the mode 63. In practice, this provides for a reduced mode-bore interference in case of bending of the laser tube. In particular, as shown on an exaggerated scale on FIG. 4, the tapered bore 62 interferes less with the tapered mode 63 upon bending of the bore, than if the taper of the bore would hug the mode.

The principles of the subject invention are not restricted in their application to gaseous laser gain media. For instance, they may also be applied to solidstate, crystalline, semiconductor-junction, liquid and other laser gain media or means.

Figure 5:
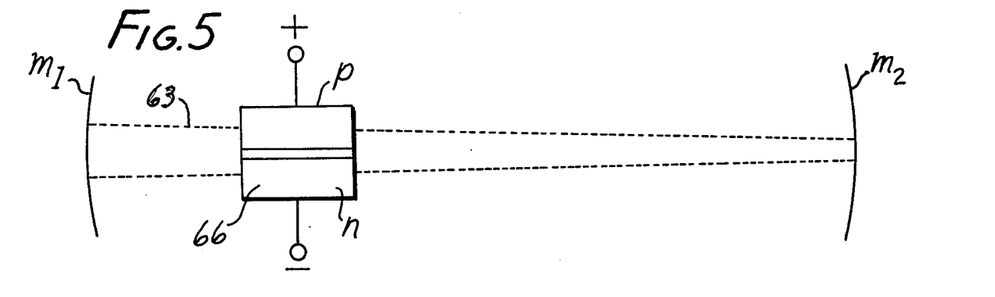
FIG. 5 is a diagrammatic view of a laser apparatus in accordance with a further preferred embodiment of the subject invention.

For instance, and as shown in FIG. 5, a p-n junction laser device may be interposed between the end mirrors $m_1$ and $m_2$, which display the above mentioned radius and center of curvature relationships. Semiconductor-junction lasers are, for instance, described in M. Brotherton, MASERS AND LASERS (McGraw-Hill, 1964) pp. 129 to 137.

Figure 6:
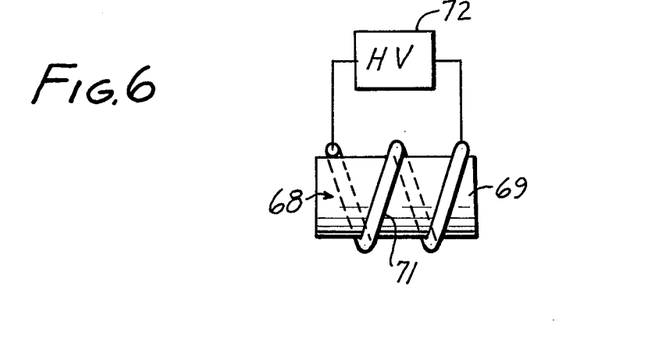
FIG. 6 is a diagrammatic view of a laser component set usable in the apparatus of FIG. 5 in accordance with a further embodiment of the subject invention.

If desired, an optically pumped laser gain medium 68 may be placed between the above mentioned mirrors $m_1$ and $m_2$ in lieu of the semiconductor device 66. As illustrated in FIG. 6, the medium 68 may include a rod 69 of a suitable crystal, such as ruby, which is pumped by a flash tube 71 energized from a high voltage source 72. The latter book by Brotherton describes ruby lasers on pp. 115 et seq.

Various pumping methods for semiconductor lasers, along with optical pumping, have been described by Marshall I. Nathan in a chapter entitled "Semiconductor Lasers" in the above mentioned book entitled LASER DEVICES AND APPLICATIONS, by Ivan P. Kaminow et al, pp. 60 et seq.

The semiconductor device 66, medium 68 or rod 69 is preferably located at a laser mode pivot point between the mirrors $m_1$ and $m_2$, such as the point 55 shown in FIG. 2 or the point defined by $x_p$ in equations (5) and (6).

Within the broad scope of the subject invention, the teachings herein disclosed may be applied to fluid laser gain media other than gaseous media. The term "fluid laser gain media" as herein employed is sufficiently broad to cover gaseous laser gain media and laser dyes or other liquid laser gain media.

As already indicated above, the lasers herein disclosed may be potted. In particular, and with reference to FIG. 1, the structure 36 may in fact be a container having wall portions, such as partially seen at 36 and 36', laterally spaced from the laser tube 15, and containing material 38' for potting the laser tube in such container. For example, the laser may be potted in a tubular container including wall portions 36 and 36' and extending between the nipple structures 17 and 19 along the laser tube 15 in spaced relationship thereto. The mounting posts 38 and 39 may then be deleted.

The potting container may, of course, have an opening at one of the nipples 17 and 19 for receiving the potting compound 38', and may be closed at the other of the nipples 17 and 19 for preventing escape of the potting material during pouring thereof. In this respect, the potting container may have a bottom portion engaging the nipple 17 as illustrated for the mounting post 38 in FIG. 1. Alternatively, the potting container may have a removable bottom portion if it is desired that no part of the potting container be in force transmitting relationship with the laser structure, other than through the potting compound 38'.

Various potting compounds and techniques are well known and routinely employed particularly in the electronic and semiconductor component field. Suitable potting compounds, depending on desired thermal conductivity, operating temperatures and elasticity, include urethane elastomers, silicone rubber and other elastomeric potting compounds, epoxy resin, polyester resin and other resinous potting compounds.

Upon insertion in the container and around the laser tube 12, the potting material 38' either sets or is cured depending on the material employed.

The subject invention thus provides a laser gain medium, such as a suitable gas mixture, in a bore 26 or other elongate cavity of a laser structure 12, a pair of end mirrors $m_1$ and $m_2$ facing each other via the laser gain medium and elongate cavity, and a container for the laser structure 22 having wall portions 36 and 36' laterally spaced from the laser structure 12. The invention according to the currently discussed aspect pots the laser structure 12 in the container 36, 36' with a potting material 38', and provides laser action with the end mirrors $m_1$ and $m_2$ and laser gain medium in the potted laser structure.

The subject invention similarly resides in laser apparatus comprising means for providing laser action, including a laser gain medium, such as a suitable gas mixture, means or structure for providing a bore 26 or other elongate cavity for containing the laser gain medium, and a pair of end mirrors $m_1$ and $m_2$ mounted at opposite ends of the elongate cavity, such as shown in FIG. 1. Accordingly to the currently discussed aspect of the subject invention, the laser apparatus also includes means for mounting the elongate structure or cavity providing means 12, including a container having wall portions 36 and 36' laterally spaced from the structure or cavity providing means 12, and material 38' for potting the structure or cavity providing means 12 in the container 36, 36'. As shown in FIG. 1, the structure or cavity providing means 12 may include a bendable and breakable tube 15 of a gas laser 10.

Preferably, advanced embodiments of the potted laser structure and laser potting technique according to the subject invention employ the above mentioned mirror related features for reducing the sensitivity of the laser action to bending of the laser structure and tilting of the end mirrors.

Various further modifications and variations within the spirit and scope of the subject invention will become apparent from, or be suggested by, the subject extensive disclosure to those skilled in the art.

I claim:

1. Laser apparatus comprising in combination:
   means for providing laser action, including a laser gain medium and a pair of concave end mirrors facing each other via said laser gain medium; and
   means for mounting said end mirrors and permitting tilting thereof;
   one of said end mirrors having a center of curvature situated between said end mirrors at a distance from the other end mirror of up to one-eighth of the distance between said end mirrors through said laser gain medium; and
   said other end mirror having a center of curvature situated between said end mirrors at a distance from each of said end mirrors of at least three-eighth of the distance between said end mirrors through said laser gain medium.

2. Laser apparatus as claimed in claim 1, wherein:
   said laser gain medium includes a solid-state laser gain medium.

3. Laser apparatus as claimed in claim 1, wherein:
   said laser gain medium includes a crystalline laser gain medium.

4. Laser apparatus as claimed in claim 1, wherein:
   said laser gain medium includes a semiconductor-junction laser.

5. Laser apparatus as claimed in claim 1, wherein:
   said laser gain medium includes a fluid laser gain medium.

6. Laser apparatus as claimed in claim 1, including:
   a container for said laser action providing means having wall portions laterally spaced from said laser action providing means, and material in said container for potting said laser action providing means in said container.

7. Laser apparatus as claimed in claim 6, wherein:
   said elongate cavity includes a bore in said cavity providing means.

8. Laser apparatus as claimed in claim 6, wherein:
   said elongate cavity includes a bore having a taper in said cavity providing means.

9. Laser apparatus comprising in combination:
   means for providing laser action, including a gaseous laser gain medium, a bendable laser tube having a longitudinal bore for containing said gaseous layer gain medium, and a pair of concave end mirrors facing each other via said gaseous laser gain medium and bore; and
   means for mounting said end mirrors and said bendable tube and permitting bending of said tube;
   one of said end mirrors having a center of curvature situated between said end mirrors at a distance from the other end mirror of up to one-eighth of the distance between said end mirrors through said longitudinal bore; and
   said other end mirror having a center of curvature situated between said end mirrors at a distance from each of said end mirrors of at least three eighth of the distance between said end mirrors through said longitudinal bore.

10. Laser apparatus as claimed in claim 1, wherein:
    said mounting means include means for interconnecting said end mirrors with said bendable laser tube.

11. Laser apparatus as claimed in claim 9, wherein:
    said mounting means include means for mounting said end mirrors at opposite ends of said bendable laser tube.

12. Laser apparatus as claimed in claim 9, wherein:
    said mounting means include a bendable support coupled to said bendable laser tube for bending of said laser tube with said support.

13. Laser apparatus as claimed in claim 1 or 9, wherein:
    said mounting means include a bendable support coupled to said end mirrors for tilting said end mirrors upon bending of said support.

14. Laser apparatus as claimed in claim 1 or 9, wherein:
    said mounting means include means for tilting said end mirrors in opposite senses.

15. Laser apparatus as claimed in claim 1 or 9, wherein:
said mounting means include a bendable support, means for coupling a first portion of said support to said one end mirror, and means for coupling a second portion of said support, spaced from said first portion, to the other end mirror.

16. Laser apparatus as claimed in claim 9, 10, 11 or 12, wherein:
said bore has a taper proceeding in a direction toward said other mirror.

17. Laser apparatus as claimed in claim 1 or 9, wherein:
said means for providing laser action include means for providing a laser mode between said end mirrors; and
said mounting means including means for pivoting said laser mode in accordance with the following relationship:

$$x_2 = \frac{(x_1 - x_p)d^2 + x_1 x_p^2}{2(x_1 - x_p)d + x_p^2}$$

wherein:
$x_1$ = radius of curvature of said one mirror,
$x_2$ = distance between said one mirror and center of curvature of said other mirror,
$x_p$ = distance between said one mirror and a point of said laser mode pivoting, and
$d$ = distance between said end mirrors.

18. Laser apparatus as claimed in claim 9, wherein:
said mounting means include a bendable support coupled to said bendable laser tube at a first mounting point located closer to said one mirror than to said other mirror, and at a second mounting point spaced from said first mounting point, for bending said laser tube with said bendable support, and means for mounting said end mirrors at opposite ends of said bendable laser tube; and
said means for providing laser action include means for providing between said end mirrors a laser mode pivoting in response to said bending according to the following relationship:

$$x_2 = \frac{(x_1 - x_p)d^2 + x_1 x_p^2}{2(x_1 - x_p)d + x_p^2}$$

wherein:
$x_1$ = distance between said first mounting point and the center of curvature of said one mirror,
$x_2$ = distance between said first mounting point and the center of curvature of said other mirror,
$x_p$ = distance between said first mounting point and a point of said laser mode pivoting, and
$d$ = distance between said mounting points.

19. Laser apparatus as claimed in claim 9, wherein:
said bore has an end at a predetermined point between said end mirrors according to the following relationship:

$$x_2 = \frac{(x_1 - x_p)d^2 + x_1 x_p^2}{2(x_1 - x_p)d + x_p^2}$$

wherein:
$x_1$ = radius of curvature of said one mirror,
$x_2$ = distance between said one mirror and center of curvature of said other mirror,
$x_p$ = distance between said one mirror and said end of the bore, and
$d$ = distance between said mirrors.

20. Laser apparatus as claimed in claim 9, wherein:
said mounting means include a bendable support coupled to said bendable laser tube at a first mounting point located closer to said one mirror than to said other mirror, and at a second mounting point spaced from said first mounting point, for bending said laser tube with said support, and means for mounting said end mirrors at opposite ends of said bendable laser tube; and
said bore has an end at a predetermined point between said end mirrors according to the following relationship:

$$x_2 = \frac{(x_1 - x_p)d^2 + x_1 x_p^2}{2(x_1 - x_p)d + x_p^2}$$

wherein:
$x_1$ = distance between said first mounting point and the center of curvature of said one mirror,
$x_2$ = distance between said first mounting point and the center of curvature of said other mirror,
$x_p$ = distance between said first mounting point and a point of said laser mode pivoting, and
$d$ = distance between said mounting points.

21. Laser apparatus as claimed in claim 19 or 20, wherein:
said bore has a taper proceeding from said end in a direction toward said other mirror.

22. Laser apparatus comprising in combination:
means for providing laser action, including a gaseous laser gain medium, a bendable laser tube containing said gaseous laser gain medium, and a pair of concave end mirrors mounted at opposite ends of said laser tube and facing each other via said gaseous laser gain medium; and
means for mounting said laser tube including a container having wall portions laterally spaced from said laser tube, and material for potting said laser tube in said container;
one of said end mirrors having a center of curvature situated between said end mirrors at a distance from the other end mirror of up to one-eighth of the distance between said end mirrors through said longitudinal bore; and
said other end mirror having a center of curvature situated between said end mirrors at a distance from each of said end mirrors of at least three eighth of the distance between said end mirrors through said longitudinal bore.

23. Laser apparatus as claimed in claim 22, wherein:
said laser tube has a longitudinal bore for containing said laser gain medium between said mirrors.

24. Laser apparatus as claimed in claim 22, wherein:
said laser tube has a bore having a taper proceeding in a direction toward said other mirror.

25. In a method of providing laser action, the improvement comprising in combination the steps of:
providing a laser gain medium;
providing a pair of concave end mirrors facing each other via said laser gain medium by providing one of said mirrors with a center of curvature situated between said end mirrors at a distance from the other end mirror of up to one-eighth of the distance between said end mirrors through said laser gain medium and providing said other end mirror with a center of curvature situated between said end mirrors at a distance from each of said end mirrors of at least three-eighth of the distance between said end mirrors through said laser gain medium;

permitting said end mirrors to tilt; and providing laser action with said laser gain medium and tilted concave end mirrors.

26. A method as claimed in claim 25, including the steps of:

providing a laser structure including said end mirrors and containing said laser gain medium;

providing a container for said laser structure having wall portions laterally spaced from said laser structure;

potting said laser structure in said container with a potting material introduced into said container; and providing laser action with said end mirrors and laser gain medium in said potted laser structure.

27. A method as claimed in claim 26, including the step of:

mounting said end mirrors at opposite ends of said laser structure.

28. In a method of providing laser action, the improvement comprising in combination the steps of:

providing a gaseous laser gain medium;

containing said gaseous laser gain medium in a bendable laser tube having a longitudinal bore;

providing a pair of concave end mirrors facing each other via said gaseous laser gain medium and bore by providing one of said mirrors with a center of curvature situated between said end mirrors at a distance from the other end mirror of up to one-eighth of the distance between said end mirrors through said longitudinal bore and providing said other end mirror with a center of curvature situated between said end mirrors at a distance from each of said end mirrors of at least three-eighth of the distance between said end mirrors through said longitudinal bore;

bending said laser tube; and providing laser action with said gaseous laser gain medium and end mirrors at least while said laser tube is bent.

29. A method as claimed in claim 28, including the step of:

interconnecting said end mirrors with said bendable laser tube.

30. A method as claimed in claim 28, including the step of:

mounting said end mirrors at opposite ends of said bendable laser tube.

31. A method as claimed in claim 28, including the steps of:

providing a bendable support;

coupling said bendable laser tube to said support;

bending said support; and bending said laser tube with said bending support.

32. A method as claimed in claim 25 or 28, including the steps of:

providing a bendable support;

coupling said bendable support to said end mirrors;

bending said support; and tilting said end mirrors with said bending support.

33. A method as claimed in claim 25 or 28, including the step of:

tilting said end mirrors in opposite senses.

34. A method as claimed in claim 25 or 28, including the steps of:

providing a bendable support;

coupling a first portion of said bendable support to said one end mirror;

coupling a second portion of said bendable support, spaced from said first portion, to the other end mirror;

bending said support; and tilting said end mirrors in opposite senses with said bending support.

35. A method as claimed in claim 28, including the step of:

providing said bore with a taper proceeding in a direction toward said other mirror.

36. A method as claimed in claim 25 or 28, including the steps of:

providing a laser mode between said end mirrors; and pivoting said laser mode in accordance with the following relationship:

$$x_2 = \frac{(x_1 - x_p)d^2 + x_1 x_p^2}{2(x_1 - x_p)d + x_p^2}$$

wherein:

$x_1$ = radius of curvature of said one mirror, $x_2$ = distance between said one mirror and center of curvature of said other mirror, $x_p$ = distance between said one mirror and a point of said laser mode pivoting, and d = distance between said end mirrors.

37. A method as claimed in claim 28, including the steps of:

mounting said end mirrors at opposite ends of said laser tube;

providing a bendable support;

coupling said bendable support to said bendable laser tube at a first mounting point located closer to said one mirror than to said other mirror, and at a second mounting point spaced from said first mounting point;

bending said laser tube with said bendable support via said mounting points;

providing a laser mode between said end mirrors; and pivoting said laser mode in response to bending of said laser tube according to the following relationship:

$$x_2 = \frac{(x_1 - x_p)d^2 + x_1 x_p^2}{2(x_1 - x_p)d + x_p^2}$$

wherein:

$x_1$ = distance between said first mounting point and the center of curvature of said one mirror, $x_2$ = distance between said first mounting point and the center of curvature of said other mirror, $x_p$ = distance between said first mounting point and a point of said laser mode pivoting, and d = distance between said mounting points.

38. A method as claimed in claim 28, including the steps of:

providing said bore with an end at a predetermined point between said end mirrors according to the following relationship:

$$x_2 = \frac{(x_1 - x_p)d^2 + x_1 x_p^2}{2(x_1 - x_p)d + x_p^2}$$

wherein:
$x_2$ = radius of curvature of said one mirror,
$x_2$ = distance between said one mirror and center of curvature of said other mirror,
$x_p$ = distance between said one mirror and said end of the bore, and
d = distance between said mirrors.

39. A method as claimed in claim 28, including the steps of:
mounting said end mirrors at opposite ends of said laser tube;
providing a bendable support;
coupling said bendable support to said bendable laser tube at a first mounting point located closer to said one mirror than to said other mirror, and at a second mounting point spaced from said first mounting point;
bending said laser tube with said bendable support via said spaced mounting points; and
providing said bore with an end at a predetermined point between said end mirrors according to the following relationship:

$$x_2 = \frac{(x_1 - x_p)d^2 + x_1 x_p^2}{2(x_1 - x_p)d + x_p^2}$$

wherein:
$x_1$ = distance between said first mounting point and the center of curvature of said one mirror,
$x_2$ = distance between said first mounting point and the center of curvature of said other mirror,
$x_p$ = distance between said first mounting point and said end of the bore, and
d = distance between said mounting points.

40. A method as claimed in claim 38 or 39, including the step of:
providing said bore with a taper proceeding toward said other mirror.

41. In a method of providing laser action, the improvement comprising in combination the steps of:
providing a gaseous laser gain medium;
containing said gaseous laser gain medium in a bendable laser tube;
providing a pair of concave end mirrors facing each other via said gaseous laser gain medium by providing one of said mirrors with a center of curvature situated between said end mirrors at a distance from the other end mirror of up to one-eighth of the distance between said end mirrors and providing said other end mirror with a center of curvature situated between said end mirrors at a distance from each of said end mirrors of at least three-eighth of the distance between said end mirrors;
providing a container for said laser tube having wall portions laterally spaced from said laser tube;
potting said laser tube in said container with a potting material; and
providing laser action with said end mirrors and gaseous laser gain medium in said potted laser tube.

42. A method as claimed in claim 41, including the step of:
mounting said end mirrors at opposite ends of said laser tube.

* * * * *